United States Patent
Oklejas, Jr.

(10) Patent No.: US 9,023,210 B2
(45) Date of Patent: May 5, 2015

(54) METHOD AND APPARATUS FOR OSMOTIC POWER GENERATION

(75) Inventor: Eli Oklejas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 280 days.

(21) Appl. No.: 12/961,776

(22) Filed: Dec. 7, 2010

(65) Prior Publication Data

US 2011/0133487 A1 Jun. 9, 2011

Related U.S. Application Data

(60) Provisional application No. 61/267,146, filed on Dec. 7, 2009.

(51) Int. Cl.
*B01D 61/06* (2006.01)
*F03G 7/00* (2006.01)
*B01D 61/00* (2006.01)

(52) U.S. Cl.
CPC .............. *F03G 7/005* (2013.01); *B01D 61/00* (2013.01); *B01D 61/06* (2013.01)

(58) Field of Classification Search
CPC ..... Y02E 10/36; F03G 7/00; C02F 2201/009; B01D 61/00; B01D 61/002; B01D 61/005; B01D 61/007; B01D 61/02; B01D 61/025; B01D 61/04; B01D 61/06; B01D 61/08; B01D 61/12; B01D 63/08; B01D 2313/246
USPC ........ 210/637, 634, 644, 649, 650, 652, 767, 210/145, 147
See application file for complete search history.

(56) References Cited

U.S. PATENT DOCUMENTS

| | | | |
|---|---|---|---|
| 3,587,227 A | | 6/1971 | Weingarten |
| 3,906,250 A | | 9/1975 | Loeb |
| 4,177,146 A | | 12/1979 | Popper et al. |
| 4,193,267 A | * | 3/1980 | Loeb ............................. 60/649 |
| 4,966,708 A | * | 10/1990 | Oklejas et al. ............... 210/637 |
| 4,983,301 A | * | 1/1991 | Szucz et al. .................. 210/636 |

(Continued)

FOREIGN PATENT DOCUMENTS

| | | | |
|---|---|---|---|
| JP | 2003176775 A | 6/2003 | |
| WO | WO 20070033675 | 3/2007 | |
| WO | WO 2007/134226 A1 * | 11/2007 | .............. F01K 25/06 |

OTHER PUBLICATIONS

PCT/US2007/134226 Publication PDF.*

(Continued)

*Primary Examiner* — Allison Fitzsimmons
(74) *Attorney, Agent, or Firm* — Harness, Dickey & Pierce, P.L.C.

(57) ABSTRACT

An osmotic power generation system and method for generating osmotic power includes a membrane chamber having a semi-permeable membrane therein defining a first portion and a second portion therein. The system also includes a first pump communicating a first fluid to the first portion and a second pump communicating a second fluid to the second portion. The second fluid has higher total dissolved solids than the first fluid. A second portion energy recovery device is in fluid communication with the second portion. A power generator is in communication with the second portion energy recovery device generating electrical power in response to the second portion energy recovery device and the pressure in the second portion.

15 Claims, 4 Drawing Sheets

(56) References Cited

U.S. PATENT DOCUMENTS

| | | | |
|---|---|---|---|
| 5,755,102 A | 5/1998 | Assaf et al. | |
| 6,185,940 B1 | 2/2001 | Prueitt | |
| 6,313,545 B1 | 11/2001 | Finley et al. | |
| 6,468,431 B1* | 10/2002 | Oklelas, Jr. | 210/652 |
| 7,871,522 B2* | 1/2011 | Stover et al. | 210/652 |
| 2004/0089605 A1* | 5/2004 | Brandt et al. | 210/652 |
| 2007/0181473 A1* | 8/2007 | Manth et al. | 210/137 |
| 2007/0289904 A1* | 12/2007 | Oklejas | 210/87 |
| 2007/0295650 A1* | 12/2007 | Yoneda et al. | 210/97 |
| 2008/0023410 A1* | 1/2008 | Efraty | 210/741 |
| 2008/0210634 A1* | 9/2008 | Thorsen et al. | 210/653 |
| 2009/0071902 A1* | 3/2009 | Stover et al. | 210/637 |

OTHER PUBLICATIONS

Wikipedia, Osmotic power, http://en.wikipedia.org/wiki/Osmotic_power, Mar. 7, 2011.

* cited by examiner

METHOD AND APPARATUS FOR OSMOTIC POWER GENERATION

CROSS-REFERENCE TO RELATED APPLICATIONS

This application claims the benefit of U.S. Provisional Application No. 61/267,146 filed on Dec. 7, 2009. The disclosure of the above application is incorporated herein by reference.

TECHNICAL FIELD

The present disclosure relates generally to osmosis power generation systems, and, more specifically, to a method and apparatus for improving the efficiency of an osmotic power generation system.

BACKGROUND

The statements in this section merely provide background information related to the present disclosure and may not constitute prior art. Producing alternative forms of energy that do not rely upon fossil fuels continues to be an important goal for energy producers. Wind, solar and hydroelectric are important alternative energy sources. Osmotic power generation is another form of alternative energy production that has become more interesting lately. Osmotic power generation uses osmotic principles that occur across a semi-permeable membrane. When a low total dissolved solid (TDS) fluid such as river water is placed on one side of the membrane and a second higher total dissolved solid fluid such as sea water is placed on the second side of the membrane, flow through the membrane will continue until the amount of total dissolved solids on each side of the membrane have been equalized. That is, flow of low total dissolved solid fluid into the membrane increases the pressure across the membrane. The pressure across the membrane equals the difference in the osmotic pressure. To allow a flow to occur across the membrane, the pressure differential must be lower than the osmotic pressure. To obtain a reasonable flow rate, the pressure differential must be substantially less than the osmotic pressure.

SUMMARY

This section provides a general summary of the disclosure, and is not a comprehensive disclosure of its full scope or all of its features.

The present disclosure provides systems used to recover hydraulic energy of the osmotic flow with minimal equipment costs to maximize efficiency of the process.

In one aspect of the invention, an osmotic power generation system includes a membrane chamber having a semi-permeable membrane therein defining a first portion and a second portion therein. The system also includes a first pump communicating a first fluid to the first portion and a second pump communicating a second fluid to the second portion. The second fluid has higher total dissolved solids than the first fluid. A second portion energy recovery device is in fluid communication with the second portion. A power generator is in communication with the second portion energy recovery device generating electrical power in response to the second portion energy recovery device and the pressure in the second portion.

In another aspect of the invention, a method of generating osmotic power in a membrane chamber with a semi-permeable membrane therein defining a first portion and a second portion therein includes communicating a first fluid to the first portion and communicating a second fluid to the second portion. The second fluid has a higher total dissolved solids than the first fluid. The method also includes generating osmotic pressure in the second portion, communicating fluid from the second portion to a second portion energy recovery device in response to the osmotic pressure and generating power at a power generator in response to communicating fluid from the second portion to a second portion energy recovery device.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
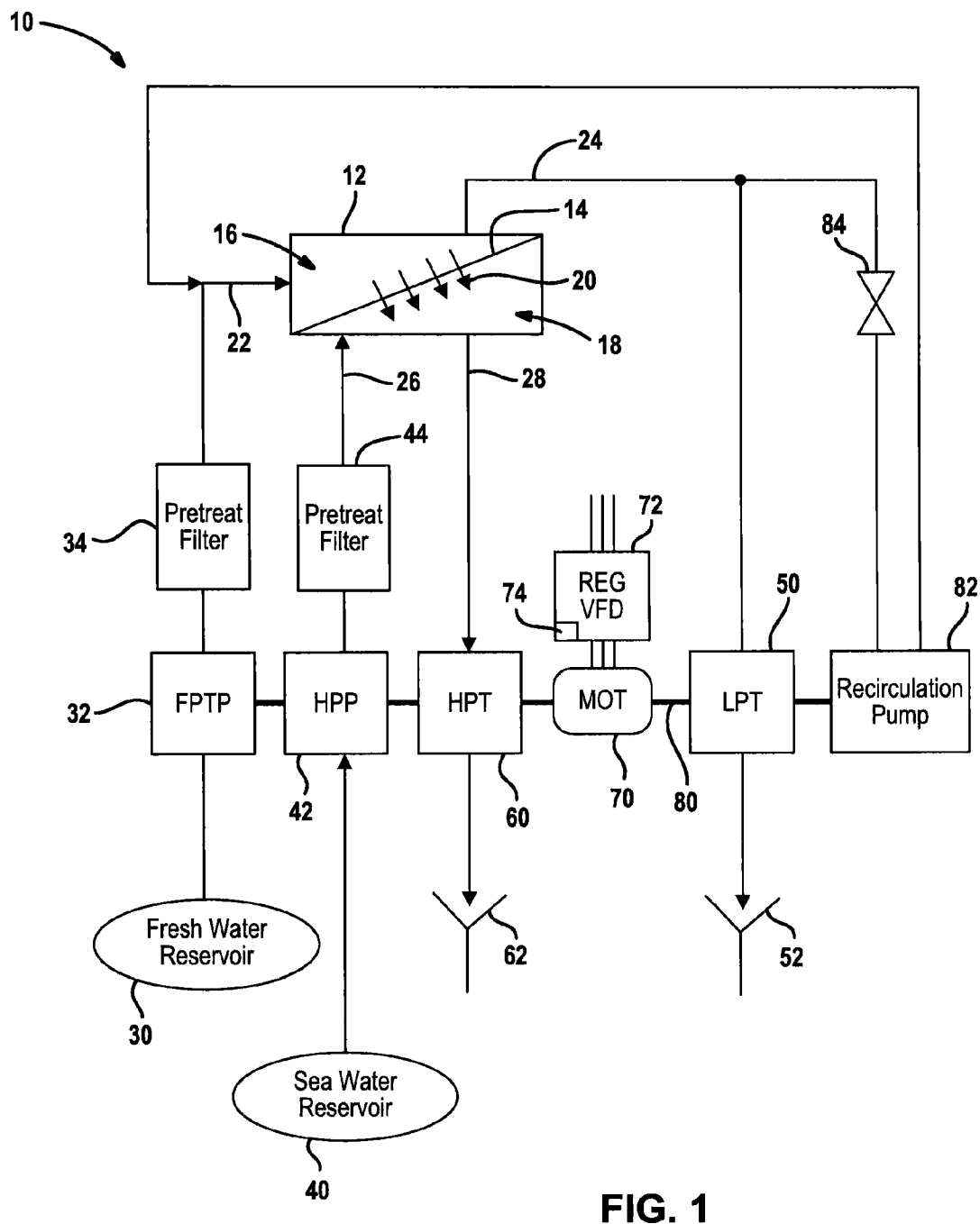
FIG. 1 is a block diagrammatic view of a first system according to a first embodiment of the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

Referring now to FIG. 1, an osmotic power generation system 10 is illustrated. A membrane chamber 12 includes a membrane 14 therein. The membrane 14 divides the membrane chamber 12 into a first portion 16 and a second portion 18. The first portion 16 is a fresh-water or low total dissolved solid portion. The second portion 18 is a sea water or higher total dissolved solid portion. The total dissolved solids in the second portion 18 are higher than the total dissolved solids in the first portion 16. The membrane 14 allows the low total dissolved solid fluid to pass through the membrane in the direction of arrows 20 and increase the pressure within the second portion 18. In this disclosure, fresh water will be used interchangeably with low total dissolved solids fluid and sea water will be used interchangeably with higher total dissolved solids fluid.

The first portion 16 of the membrane chamber 12 includes an input 22 and an output 24. The second portion 18 of the membrane chamber 12 includes an input 26 and an output 28.

A fresh water reservoir 30 is used to provide fresh water to the input 22 of the first portion 16. A pump 32 is used to pump fresh water from the fresh water reservoir 30 through a pretreatment filter 34 and into the input 22 of the first portion 16. The pretreatment filter 34 may filter at least some dirt or other foulants from entering the first portion 16 of the chamber 12. It should be noted that not all dirt and foulants may be removed using the pretreatment filter 34 as will be described below.

Sea water is provided to the second portion 18 of the membrane chamber 12 from a sea water reservoir 40. A pump 42 pumps the water from the sea water reservoir through a pretreatment filter 44 and into the input 26 of the second portion 18 of the membrane chamber 12.

Excess fresh water from the first portion 16 of the membrane chamber 12 is removed through the output 24. The output 24 may be in communication with an energy recovery device such as a turbine 50. The turbine 50 may be used to convert some of the hydraulic energy in the fresh water fluid from the output 24 into mechanical energy. Output fluid from the turbine 50 may be communicated to a drain 52.

A portion of the water from output 24 may be re-circulated by a recirculation pump 82 back to input 22 to enhance flow velocity in first portion 16 to reduce build-up of foulants on membrane 14. Flow to the pump 82 may be controlled by a valve 84. Flow may also be controlled by pipe sizing or other restriction device. The pump 82 may also be on the common shaft 80.

The sea water may be removed from the second portion 18 of the chamber 12 through the output 28 which is in fluid communication with an energy recovery device such as a turbine 60. Hydraulic energy in the sea water may thus be converted to mechanical energy. The output of the turbine 60 may be communicated to a drain 62.

A motor 70 that is in communication with a regenerative variable frequency drive (REG VFD) 72 may be used to drive the motor 70 which may also act as a generator. This may be referred to as a motor/generator. A controller 74 may control the operation of the motor 70 and control switching to a generator based on a speed of the motor. A speed signal may be generated at the motor or a sensor therein or on the shaft 80 to be used as a determination of when to switch the motor to a general mode.

A common shaft 80 may extend between at least some of the various components 32, 42, 50, 60, 70. For example, the shaft 80 may extend between all the components, including the pump 32, the pump 42, the turbine 50, the turbine 60 and the motor 70.

In operation, the motor 70 may be energized to cause the shaft 80 and the pumps 32, 42 and turbines 50, 60 to rotate. Fresh water from the reservoir is provided into the first portion 16 of the membrane chamber 12 while simultaneously sea water from the sea water reservoir 40 is provided to the second portion 18 of the membrane chamber 12. Some of the fresh water in the first portion 16 permeates through the membrane 14 into the second portion 18. Excess fresh water drives the turbine 50. Flow from outlet 28 equals the flow through inlet 26 plus membrane flow 20. This combined flow drives the turbine 60. The turbines 50 and 60 rotate the shaft 80.

The fresh water flow through the pump 32 exceeds the flow across the membrane 14 so that dirt and other foulants may be flushed away through output 24.

The motor 70 operates the shaft 80 until a predetermined speed has been reached. After the predetermined speed has been reached, the hydraulic energy in the output sea water 28 exceeds the power requirements of the pumps 32 and 42. The motor 70 is thus converted to a generator to absorb the excess shaft power and convert the rotational energy to electrical energy using the regenerative variable frequency drive 72. Turbine 60 and pump 42 are adjusted to provide the pressure in second portion 18 as needed to obtain the desired membrane flow 20.

Aspects of using a common shaft include the ability to transfer power between all the hydraulic components to eliminate energy losses from converting to electricity and back to mechanical power for each pump or turbine. The regenerative variable frequency drive allows the motor to start the system but then convert to a generator as soon as the output from the turbines 50, 60 exceed the power absorption of the pumps 32, 42.

Figure 2:
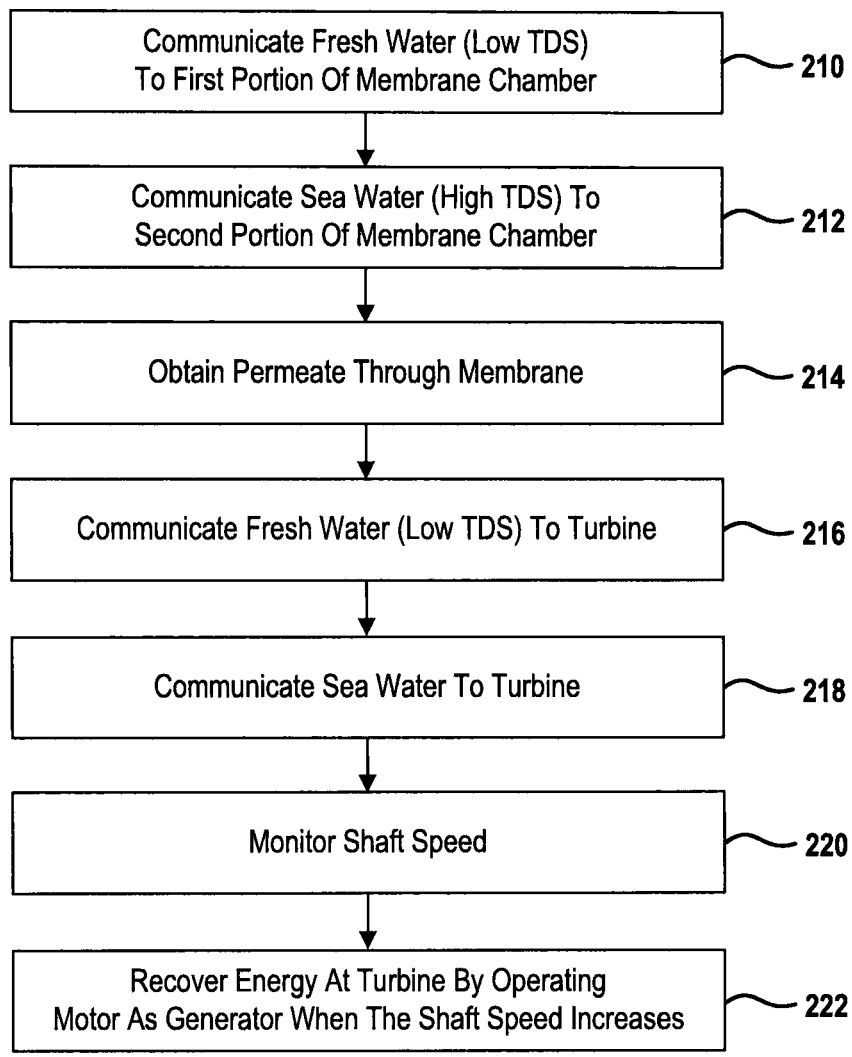
FIG. 2 is a flowchart of a method for operating the system of FIG. 1.

Referring now to FIG. 2, a method of operating the system is set forth. In step 210, fresh water is communicated with low total dissolved solids to the first side of the membrane in response to the shaft 80 rotating under the control of the motor acting as a motor. In step 212, sea water with high total dissolved solids is communicated to the second side of the membrane in response to the shaft 80 rotating under the control of the motor acting as a motor. Permeate from the first portion of the chamber to the second portion of the chamber occurs through the membrane in step 214. In step 216, excess fresh water (that which is above the amount passing through the membrane) is communicated to the fresh water turbine 50. In step 218, sea water is communicated to the sea water turbine 60 illustrated in FIG. 1. In step 220, the shaft speed of the shaft 80 of FIG. 1 may be monitored to determine whether the amount of power input at the turbines is greater than the amount of power required by the pumps. This may be done by monitoring the speed of the shaft 80. In step 222, energy is recovered at the turbines by rotating the shaft 80. When the shaft speed increases beyond the power requirements of the pumps, the motor 70 is converted to operate as a generator using the regenerative variable frequency drive when the shaft speed increases.

Figure 3:
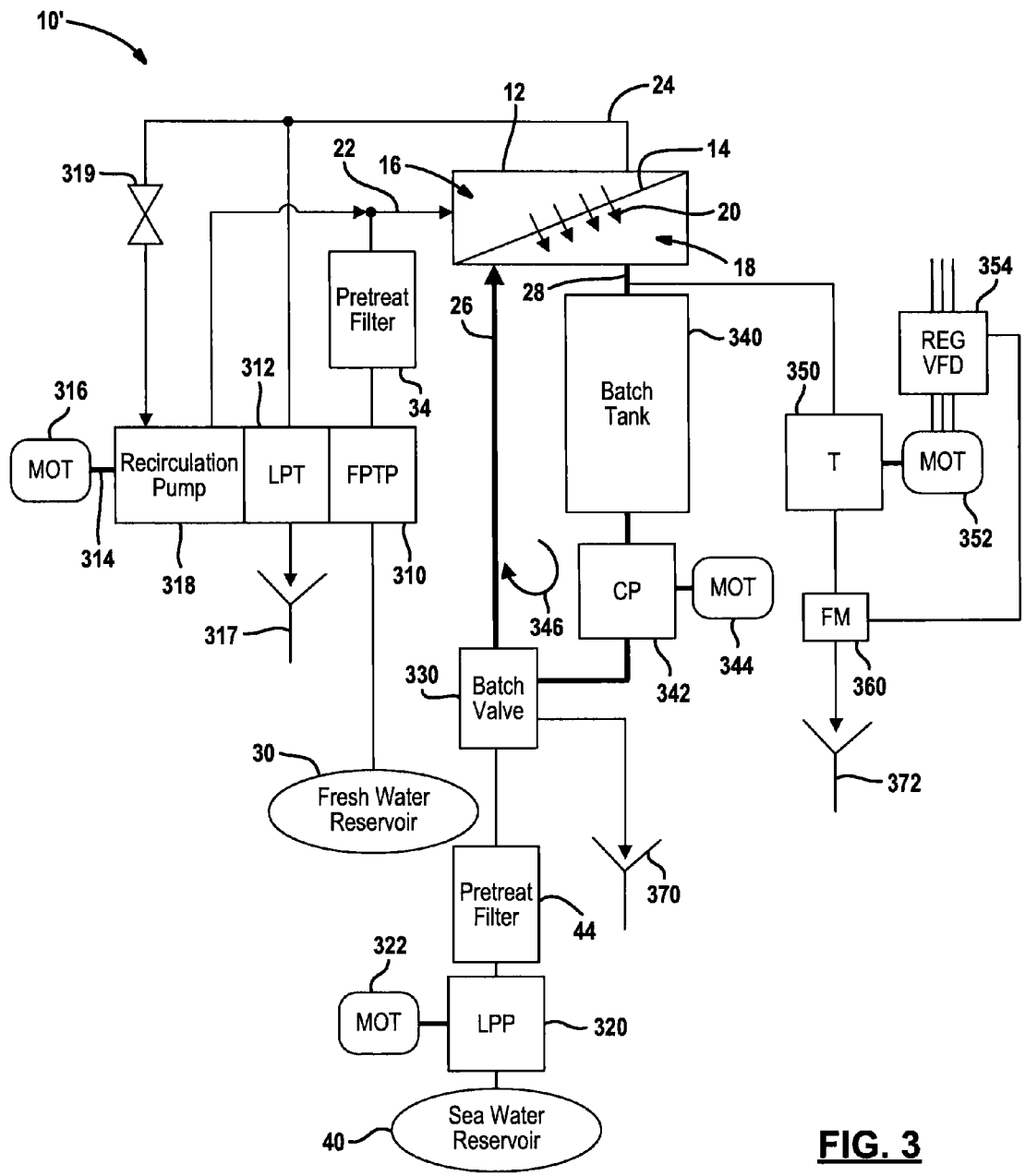
FIG. 3 is a block diagrammatic view of a second embodiment of a system according to the present disclosure.

Referring now to FIG. 3, a second embodiment of an osmotic power generation system 10' is illustrated. In this embodiment, the membrane chamber 12 has the same components illustrated with the same reference numerals. The system 10' is a batch-operated system. The system also includes the fresh water reservoir 30 and the salt water reservoir 40 illustrated in FIG. 1.

The fresh water reservoir 30 is in communication with a pump 310. The pump 310 pumps fluid from the fresh water reservoir 30 through the pretreatment filter 34. The output of the first portion 16 of the membrane chamber 12 is communicated through an energy recovery device such as a turbine 312. The turbine 312 and the pump 310 may have a common shaft 314 extending therethrough. A motor 316 disposed on the shaft 314 may be used to start the pump process 310. The motor 316 may provide an amount of energy to increase the output of the pump 310. That is, the motor 316 supplies enough energy to make up the difference in power between the turbine 312 and the input to the pump 310. Water from the turbine may be drained through a drain 317.

Some of the water from the output 24 of the first portion 24 may be recirculated using a recirculation pump 318. The output of the recirculation pump 318 is communicated to the input 22 of the first portion 16. The amount of flow to the pump may be regulated by a valve 319 or through pipe sizing. The pump 318 may be driven by shaft 314.

The sea water reservoir 40 is in communication with a pump 320 that is driven by a motor 322. The pump 320 communicates sea water from the sea water reservoir 40 through the pretreatment filter 44 to a batch valve 330. The pump 320 flushes out brine from tank 340 and thus it provides low pressure to tank 340. The batch valve 330 is in communication with the input 26 of the second portion 18 of the membrane chamber 12 and a drain 370. Fluid from the second portion 18 and the batch tank 340 may be removed through the drain 370.

The output 28 of the second portion 18 of the membrane chamber 12 is in fluid communication with a batch tank 340. The batch tank 340 is in fluid communication with a circulation pump 342 which may be driven by a motor 344. The batch valve 330 may be closed after a predetermined amount of sea water has been introduced into the second portion 18 of the membrane chamber 12. Upon closing of the batch valve which isolates the batch process from the sea water reservoir 40, the circulation pump 342 circulates sea water from the batch tank 340 in the direction illustrated by the arrow 346.

The output 28 of the second portion 18 of the membrane chamber 12 is also in communication with an energy recovery device such as a turbine 350. The turbine 350 converts the excess energy caused from the permeate flow through the membrane into mechanical (rotational) energy. The turbine 350 may drive the motor 352 which acts as a generator to generate electricity from the rotational energy. A regenerative variable frequency drive 354 may be in communication with the motor 352 to convert the motor 352 to a generator to generate electrical power.

A flow meter 360 may generate a flow signal that is communicated to the regenerative variable frequency drive 354. The pressure in batch tank 340 and second membrane portion 18 will be initially high due to the high total dissolved solids (TDS) difference between first membrane portion 16 and second membrane portion 18. Fresh water crosses membrane 20 and an equal volume of water exits through outlet 28 and passes through turbine 350. Consequently, the TDS in batch tank 340 and second membrane portion 18 decrease resulting in a pressure reduction. When the pressure in the batch tank 340 decreases to the point that no more useful power is generated by the turbine 350, the flow meter 360 generates a signal that indicates low pressure and the process may be started again with fresh sea water. The regenerative variable frequency device 354 may reduce the rotational speed of the turbine 350 to maintain the flow from the second portion 28 in response to the flow meter signal. Fluid passing through the turbine 350 and flow meter 360 may pass through the drain 372.

Figure 4:
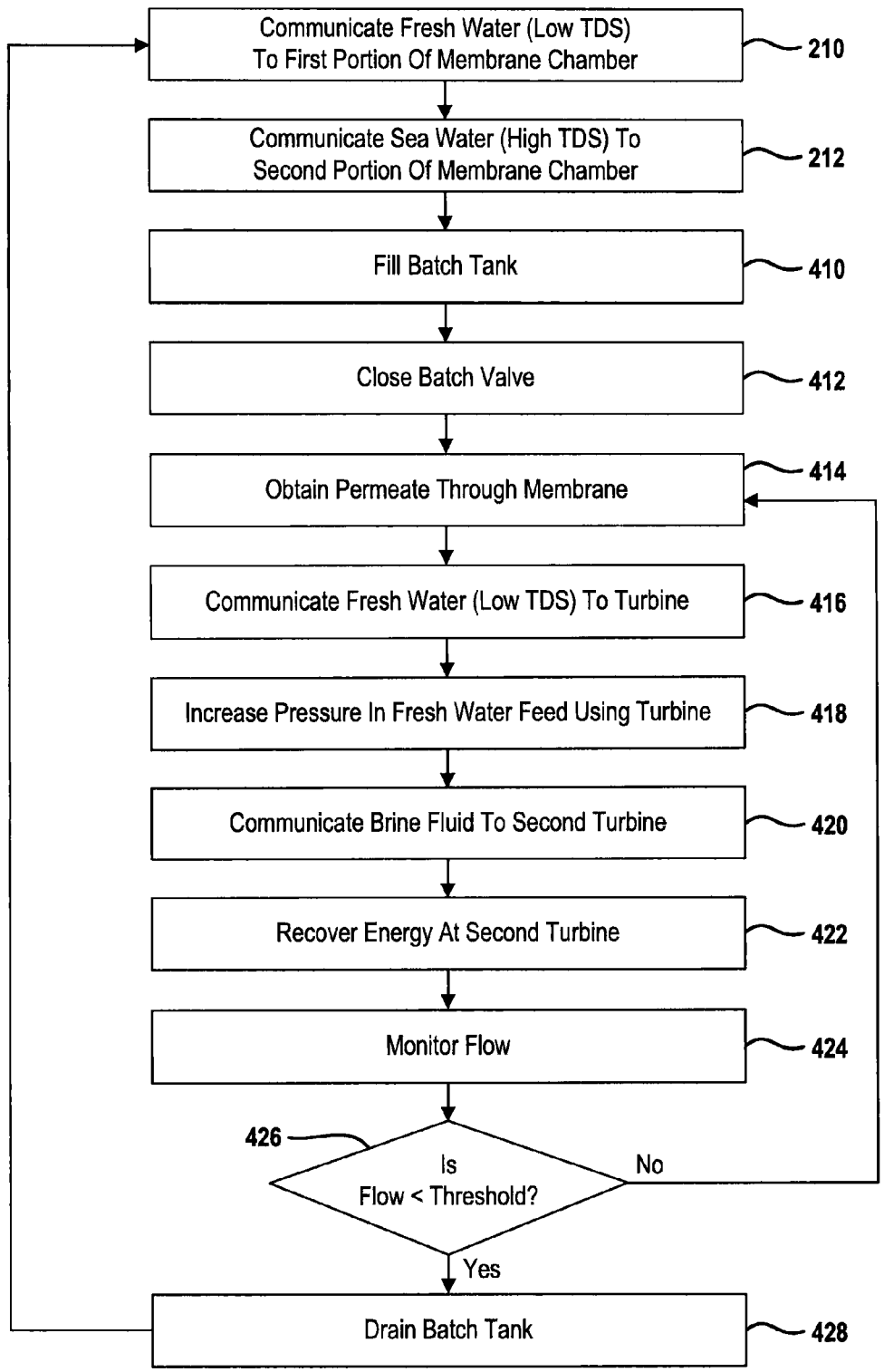
FIG. 4 is a flowchart of a method for operating the system illustrated in FIG. 3.

Referring now to FIG. 4, the system operates in the first two steps in a similar manner to FIG. 2 in which fresh water is communicated to the first portion of the membrane chamber and sea water is communicated to the second portion of the membrane chamber in step 212. Steps 210 and 212 are performed in response to operation of motors 316 and 322 and pumps 310 and 320, respectively. For step 410 the valves 330 are positioned to allow sea water to flow from the pretreatment filter into the second portion 18. In step 410, the batch tank 340 illustrated in FIG. 3 is filled using the motor 322 and pump 320 while purging water from the previous batch cycle through valve 330 to drain 370. After filling of the batch tank, the batch valve 330 is closed in step 412. In step 414, permeate is provided through the membrane 14 into the second portion 18 of the membrane chamber 12. Fluid from the output 24 is communicated to the turbine 312 to provide some hydraulic power to power the pump 310 in step 416. The pressure in the fresh water feed from the fresh water pump 310 is increased using the energy from the turbine 312 in step 418.

Brine fluid from the output 28 is communicated to the turbine 350 in step 420. Energy may be recovered at the second turbine 350 by using the motor 352 as a generator in step 422. Thus, energy is recovered at the second turbine 350. In step 424, the flow of fluid through the turbine 350 is monitored. Pressure steadily decreases in batch tank 340 and when the flow is not less than a flow threshold in step 426, the system continues to process the system. In step 426, when the flow is less than a threshold the batch tank is drained by opening the batch valve and communicating the diluted sea water through the drain 370 illustrated in FIG. 3. After draining the batch tank, the process may be repeated from step 210. It should be noted that the process described above may be made continuous by adding a second batch tank that is switched with the first batch tank to allow one tank to be purged and filled while the other tank is used in production.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An osmotic power generation system comprising:
   a membrane chamber having a semi-permeable membrane therein defining a first portion and a second portion therein;
   a first pump communicating a first fluid to the first portion of the membrane chamber,
   a second pump communicating a second fluid to the second portion of the membrane chamber, said second fluid having a higher total dissolved solids than the first fluid;
   a first portion energy recovery device in direct fluid communication with the first portion of the membrane chamber and rotates with the first pump and the second pump on a common shaft;
   an electrical second portion energy recovery device disposed on an rotating with the common shaft, said second portion energy recovery device is in direct fluid communication with the second portion of the membrane chamber; and
   an electrical power generator in rotational communication with the first portion energy recovery device and the second portion energy recovery device through the common shaft, said electrical power generator generating electrical power in response to rotation of the first portion energy recovery device from fluid pressure from the first portion of the membrane chamber and rotation of the second portion energy recovery device from fluid pressure from the second portion of the membrane chamber.

2. A system as recited in claim 1 wherein the second portion energy recovery device comprises a first turbine and the first portion energy recovery device comprises a second turbine.

3. A system as recited in claim 1 wherein the first portion energy recovery device comprises a turbine.

4. A system as recited in claim 1 further comprising a recirculation pump recirculating first fluid water from a first portion input.

5. A system as recited in claim 4 wherein the common shaft is coupled to the recirculation pump.

6. A system as recited in claim 1 wherein the first fluid comprises fresh water and the second fluid comprises sea water.

7. A system as recited in claim 1 wherein the power generator is coupled to a regenerative variable frequency drive.

8. A system as recited in claim 1 further comprising a first pretreatment filter filtering the first fluid prior to the first portion of the membrane chamber and a second pretreatment filter filtering the second fluid prior to the second portion of the membrane chamber.

9. A method of generating osmotic power in a membrane chamber having a chamber with a semi-permeable membrane therein defining a first portion and a second portion therein, said method comprising:

communicating a first fluid to the first portion of the membrane chamber using a first pump;
communicating a second fluid to the second portion of the membrane chamber using a second pump, said second fluid having a higher total dissolved solids than the first fluid;
generating osmotic pressure in the second portion;
communicating second fluid from the second portion to an electrical second portion energy recovery device in response to the osmotic pressure;
communicating first fluid from the first portion of the membrane chamber to a first portion energy recovery device in direct fluid communication with the first portion of the membrane;
rotating the first pump, the second pump, an electrical power generator, the first portion energy recovery device, the second portion energy recovery device on a common shaft; and
generating electrical power at an electrical power generator in response to rotation of the first portion energy recovery device from fluid pressure from the first portion of the membrane chamber and rotation of the second portion energy recovery device from fluid pressure from the second portion of the membrane chamber.

10. A method as recited in claim 9 wherein communicating second fluid from the second portion to a second portion energy recovery device comprises communicating second fluid from the second portion to a turbine.

11. A method as recited in claim 9 wherein communicating first fluid from the first portion to a first portion energy recovery device comprises communicating first fluid from the first portion to a turbine.

12. A method as recited in claim 9 further comprising batch processing by circulating the second fluid from a batch tank to the second portion during power generating.

13. A method as recited in claim 12 further comprising filling the batch tank with second fluid through a batch valve having an open position during filling and a closed position during batch processing.

14. A method as recited in claim 12 further comprising generating a flow signal corresponding to a flow rate from the second portion and communicating the flow signal to a variable frequency drive associated with the power generator so that when a flow rate is below a threshold discontinuing batch operation.

15. A method as recited in claim 9 further comprising recirculating fluid from an output of the first portion to an input of the first portion using a recirculation pump.

* * * * *